United States Patent [19]

Mueller

[11] 4,387,638

[45] Jun. 14, 1983

[54] DEVICE FOR REMOVING WATER FROM THE SOLVENT RECOVERY SYSTEM OF A FAST PRINTER

[75] Inventor: Gerhard H. Mueller, Taufkirchen, Fed. Rep. of Germany

[73] Assignee: Siemens Aktiengesellschaft, Berlin & Munich, Fed. Rep. of Germany

[21] Appl. No.: 340,293

[22] Filed: Jan. 18, 1982

[30] Foreign Application Priority Data

Feb. 26, 1981 [DE] Fed. Rep. of Germany ....... 3107279

[51] Int. Cl.$^{3}$ ......................... B41F 7/30; B01D 47/00

[52] U.S. Cl. ........................................ 101/1; 261/100; 101/148

[58] Field of Search ................. 101/1, 148; 261/72 R, 261/75, 100, 101, 103, 119 R, DIG. 32, DIG. 41, DIG. 44, DIG. 65

[56] References Cited

U.S. PATENT DOCUMENTS 1,448,363 3/1923 MacFadden ........................ 261/100
1,904,686 4/1933 Humphreys ........................ 261/103
1,973,233 9/1934 Thousand ............................ 261/103
3,278,175 10/1966 Hirtz ............................... 261/103 X
3,949,668 4/1976 Smith, Jr. ............................ 101/148
4,157,682 6/1979 Mabrouk et al. .................. 101/148

*Primary Examiner*—E. H. Eickholt
*Attorney, Agent, or Firm*—Hill, Van Santen, Steadman, Chiara & Simpson

[57] ABSTRACT

The invention is directed to a device for removing water from the solvent recovery system of a fast printer. Water recovered in the solvent recovery system from solvent vapor and water vapor is passed into the open air outside of the printer frame without generating damage due to water corrosion within the printer. Recovered water is passed from a discharge pipe to an evaporation chamber containing either a heated evaporator container or to a unheated trough containing upstanding absorbent mats which suck the recovered water up into an open air space above the trough. A stream of dry warm air is generated by blowers within the printer and passes through the evaporation chamber picking up water vapor. The vapor-air mixture produced in the evaporation chamber then passes through slots formed in the printer assembly frame directly into the open air.

12 Claims, 3 Drawing Figures

DEVICE FOR REMOVING WATER FROM THE SOLVENT RECOVERY SYSTEM OF A FAST PRINTER

BACKGROUND OF THE INVENTION

The invention relates to an arrangement for the elimination of water from a solvent recovery system in a fast printer device.

Fast printer devices, such as word processors, are well-known in the field of data-processing technology and typically involve the use of a chemical solvent for treating paper being printed. After the application of solvent in a printing process, the excess solvent is conducted to a solvent recovery system including a solvent collection trap which stores unused solvent for recycling. In addition to solvent, water also arises in the recovery process and this water needs to be disposed of since recycling of the water is generally impractical. It would be ideal to arrange the printer device in direct connection with a water waste system to conduct waste water out of the solvent recovery system; however, it is seldom possible or practical to connect a printer up to the water waste system due to typical printer location and piping requirements.

An integrated or external water collection container would be another possibility for removing water passing into the solvent recovery system; however, this solution is impractical due to the excess space requirements needed for the water container and the additional handling problems frequent emptying of the water container would present. In addition, such a water collection container would require some sort of alarm or signal device to indicate the need for emptying of the filled container.

The present invention is directed to an apparatus for removing water from the solvent recovery system of a fast printer whereby water is automatically removed from the printer in an economic fashion and whereby space and handling requirements are minimal. Water removal is brought about by an evaporation process; however, evaporated water is not permitted to pass back into the printer machinery since this would tend to cause corrosion damage.

SUMMARY OF THE INVENTION

Apparatus for the removal of water from a solvent recovery system in a fast printer includes an evaporation chamber containing the heated water evaporator which receives a flow of water arising in the solvent recovery system from a discharge pipe. Passing through the evaporation chamber is a flow of blower-generated dry air which entrains water vapor molecules. The vapor-air mixture is then conducted out of the printer assembly frame into the open air through slots formed in the assembly frame. An air channel is formed on the assembly frame for conducting the dry air flow from the blower to and through the evaporation chamber. The air channel may be in the form of a capping piece to the frame or a hose contained within the printer frame.

It is within the contemplation of the present invention to have air flow generated during printing operations by means of the typical, primary, printer blower disposed at the air channel entrance. The presence of a primary blower in printer devices is typically afforded for other purposed any way, such as a source of cooling air. During printer operation pauses, the invention calls for possible use of a supplemental or secondary blower disposed within the printer frame in flow communication with the evaporation chamber to direct water vapor out of the frame and into the open air.

The temperature of the dry air flowing to the evaporation chamber is preferably about 50 degrees C. In order to avoid possible precipitation of condensed water in and about the evaporation chamber, the evaporation chamber may be formed with an insulated housing having sidewalls clad with suitable synthetic insulative material.

DESCRIPTION OF THE PREFERRED EMBODIMENTS

Figure 1:
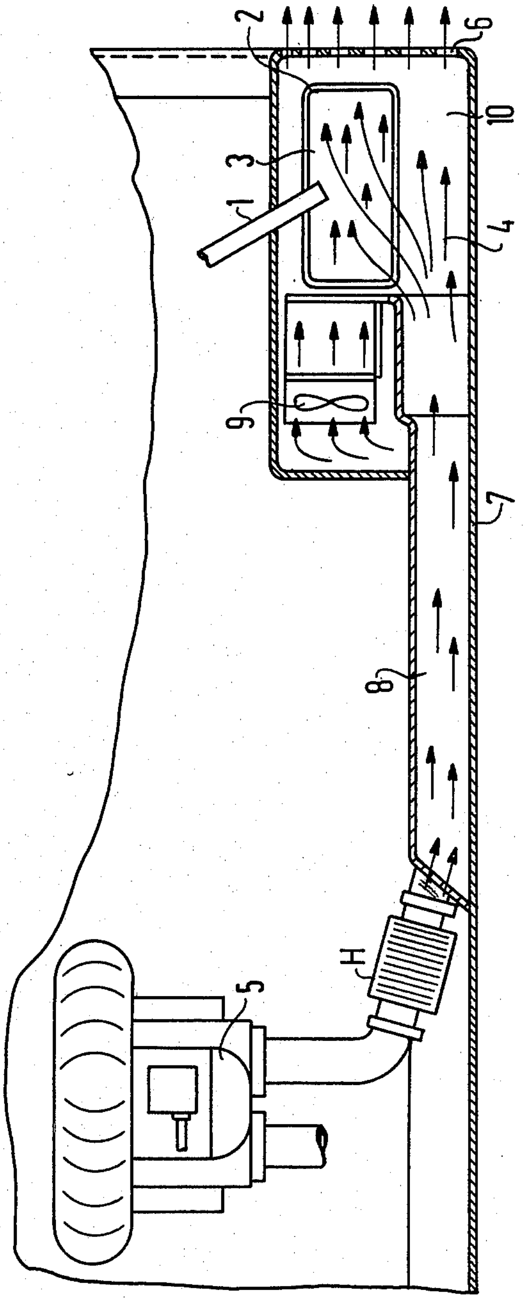
FIG. 1 is a schematic cut-away plan view of water removal apparatus for use with a printer's solvent recovery system constructed in accordance with the present invention.
Figure 2:
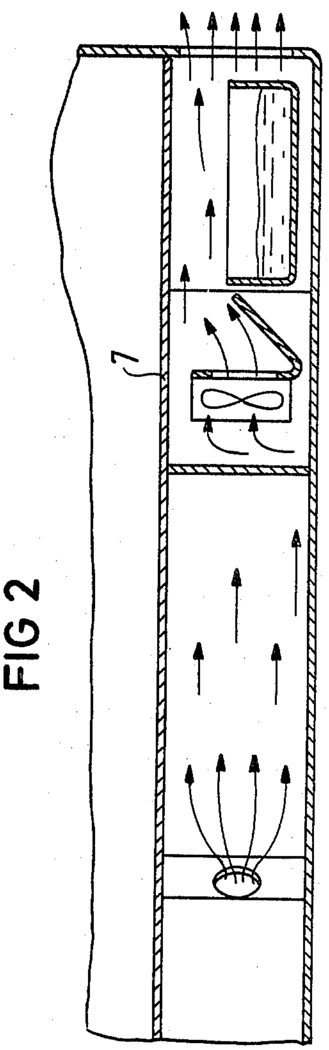
FIG. 2 is a fragmentary, side-elevational view of the water removal apparatus of FIG. 1.

In a known manner, water arising in a solvent recovery system for a fast printer assembly is passed into a water discharge pipe 1 directed downward within the printer assembly frame and leading to a typical heated water evaporator tank 2. In accordance with the present invention, as illustrated in FIGS. 1 and 2, the water recovery tank 2 is positioned within an evaporation chamber 10, wherein the supply of recovery water 3 arising in the evaporator 2 is exposed to a pressurized flow of dry air 4 being supplied by a primary blower 5 of a type typically used in printer devices for other purposes. The evaporation chamber 10 communicates with the open air outside the printer assembly frame through a plurality of sidewall slots 6 formed in the frame. An extension or capping piece 7 is formed on the assembly frame to provide an air channel or duct 8 for conducting air from the blower 5 into and through the evaporation chamber. Alternatively, a hose could be trained through the printer assembly frame to serve as the air channel.

The temperature of the air being passed through the expansion chamber 10 is preferably maintained at about 50° C. by a suitable electrical resistance heater H positioned along the air channel 8. Noises generated along the air channel are effectively damped as a result of the length and expansion area construction of the duct 8.

The primary printer blower 5 is typically switched off during printing operation pauses; however, the solvent recovery system continues to work for functional reasons such that relatively smaller amounts of water continue to be collected in the evaporator 2 even during printing pauses. Accordingly, it is within the contemplation of the present invention to provide for a smaller supplemental or secondary blower 9 positioned in flow communication with the evaporation chamber to provide a flow of dry air through the evaporation chamber so that water vapor arising in the chamber may be conducted out of the printer frame, even during printing pauses. The blower 9 is coupled to the printer operation switch, such that, when the primary blower 5 is switched off during printing pauses, the secondary blower 9 is switched on. When the primary blower 5 is operational, the secondary blower 9 is switched off. Inlet flow to the secondary blower 9 is obtained from the air channel 8 such that this air flow is drawn from ambient through the inlet of the primary blower 5.

In order to prevent condensation of the water vapor in and about the evaporation chamber 10, the metallic walls of the chamber housing are preferably interiorly clad with insulation, such as some suitable synthetic material of low thermal conductivity.

Figure 3:
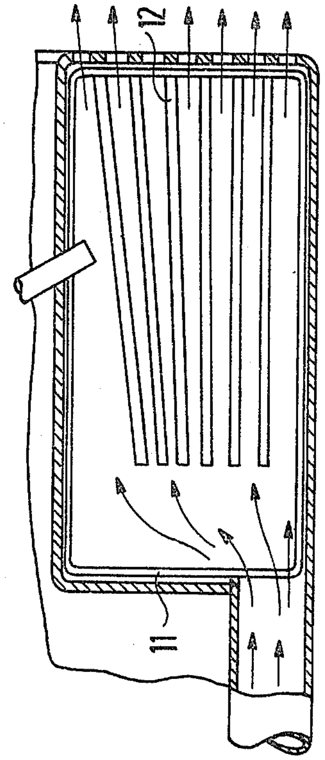
FIG. 3 is a fragmentary plan view of a further embodiment of the invention, wherein an evaporation chamber of the water removal apparatus is provided with absorbent mats upstanding in an unheated trough.

With reference to FIG. 3, the invention further contemplates entraining molecules of water recovered in the evaporation chamber with the pressurized air flows passing through the chamber without the use of a water heater evaporator. In this form of the invention, an unheated trough 11 is positioned within the evaporation chamber to receive the flow of recovered water and upstanding, generally rectangular mats 12 are disposed on edge in the trough to provide an evaporated surface rising above the level of water in the trough about which the dry air flow may pass. Accordingly, water sucked up into the mats 12 diffuses into the dry air flow passing therearound for conduction out of the printer frame and into the open air.

The mats 12 are arranged in a generally spaced-apart, parallel fashion coaxial with the flow of air through the evaporation chamber and out of the printer assembly frame. The plurality and size of the absorbent mats 12 are suitably selected with reference to the amount of air flowing by and the temperature of the air flow. If only a little water is produced, as in the case of a printer device without a solvent recovery system, then an unheated evaporator of the type shown in FIG. 3 will generally be sufficient for the removal of water from the printer without the need for periodic emptying of the evaporation chamber trough. Instead of a plurality of parallel disposed, upstanding mats, it is also within the contemplation of the present invention to utilize a single absorbent mat disposed parallel on the floor of the trough 11, providing a generally planar, horizontal evaporative surface for contacting the dry air flow through the evaporation chamber.

The present invention enables a fast printer device to be provided with a water removal assembly which operates automatically to remove recovered water from the printer, without the need for periodic emptying of the supply of recovered water. The water removal apparatus is able to operate unattended, since the evaporation and removal process adequately keeps up with the flow of recovered water into the evaporation chamber.

Although various minor modifications may be suggested by those versed in the art, it should be understood that I wish to embody within the scope of the patent warranted hereon all such modifications as reasonably and properly come within the scope of my contribution to the art.

I claim as my invention:

1. Apparatus for removing water from a solvent recovery system of a printer assembly comprising an evaporation chamber contained within a printer assembly frame having a water evaporation tank means, a discharge pipe leading to said tank means for conducting a flow of recovered water from said solvent recovery system, a blower means in said printer assembly for generating a pressurized flow of dry air, air channel means in said printer assembly for conducting said pressurized flow through said evaporation chamber, and openings in said assembly frame leading from said evaporation chamber to ambient, whereby said pressurized flow is mixed with recovered water vapor in said evaporation chamber and this air-water vapor mixture passes through said openings to ambient.

2. The apparatus of claim 1, wherein said evaporation tank means is heated.

3. The apparatus of claim 1, wherein said air channel means includes a duct wall formed as an extension of said assembly frame.

4. The apparatus of claim 1, wherein said blower means comprises a primary blower operating during printing operation periods and a relatively smaller secondary blower operating during printing operation pauses, said secondary blower being mounted directly adjacent said evaporation tank means.

5. The apparatus of claim 1, further comprising means for maintaining said pressurized flow of dry air at a temperature of about 50° C.

6. The apparatus of claim 1, wherein said evaporation chamber is formed with sidewalls interiorly clad with thermal insulation material.

7. Apparatus for removing water from a solvent recovery system of a printer assembly comprising an evaporation chamber contained within a printer assembly frame having a trough, a discharge pipe leading to said trough for conducting a flow of recovered water from said solvent recovery system, absorbent mat means disposed in said trough and forming an evaporative surface upstanding from the level of water in said trough, a blower means in said printer assembly for generating a pressurized flow of dry air, air channel means in said printer assembly for conducting said pressurized flow through said evaporation chamber over said evaporative surface and openings in said assembly frame leading from said evaporation chamber to ambient, whereby said pressurized flow is mixed with recovered water vapor in said evaporation chamber and this air-water vapor mixture passes through said openings to ambient.

8. The apparatus of claim 7, wherein said mat means comprises a plurality of generally rectangular mats disposed on edge in said trough and in spaced apart substantially parallel relation with one another disposed generally coaxial with the direction of pressurized flow through said evaporation chamber.

9. The apparatus of claim 7, wherein said air channel means includes a duct wall formed as an extension of said assembly frame.

10. The apparatus of claim 7, wherein said blower means comprises a primary blower operating during printing operation periods and a relatively smaller secondary blower operating during printing operation pauses, said secondary blower being mounted directly adjacent said trough.

11. The apparatus of claim 7, further comprising means for maintaining said pressurized flow of dry air at a temperature of about 50° C.

12. The apparatus of claim 7, wherein said evaporation chamber is formed with sidewalls interiorly clad with thermal insulation material.

* * * * *